United States Patent
Lange

(10) Patent No.: US 7,449,657 B2
(45) Date of Patent: Nov. 11, 2008

(54) COMPOUNDS FOR POSITIONING DEVICES OF VEHICLE SEATS THAT CAN BE WELDED TOGETHER

(75) Inventor: Dieter Lange, Petershagen (DE)

(73) Assignee: Faurecia Autositze GmbH & Co., KG. (DE)

( * ) Notice: Subject to any disclaimer, the term of this patent is extended or adjusted under 35 U.S.C. 154(b) by 347 days.

(21) Appl. No.: 10/510,075

(22) PCT Filed: Dec. 5, 2003

(86) PCT No.: PCT/EP03/13740

§ 371 (c)(1),
(2), (4) Date: Sep. 30, 2004

(87) PCT Pub. No.: WO2004/078512

PCT Pub. Date: Sep. 16, 2004

(65) Prior Publication Data

US 2005/0167472 A1  Aug. 4, 2005

(30) Foreign Application Priority Data

Mar. 5, 2003 (DE) ............................... 103 09 415

(51) Int. Cl.
*B23K 11/00* (2006.01)
(52) U.S. Cl. .................................................. 219/86.1
(58) Field of Classification Search ................. 219/93, 219/89, 91, 86.1
See application file for complete search history.

(56) References Cited

U.S. PATENT DOCUMENTS 5,573,345 A  *  11/1996  Voss et al. ................... 403/271

FOREIGN PATENT DOCUMENTS

| DE | 4140720 | | 6/1993 |
| DE | 43 39 508 | A1 * | 5/1994 |
| DE | 4339508 | | 5/1994 |
| EP | 0556712 | | 8/1993 |

OTHER PUBLICATIONS

International Search Report.

* cited by examiner

*Primary Examiner*—Kevin P Kerns
(74) *Attorney, Agent, or Firm*—Bourque and Associates

(57) ABSTRACT

Components for positioning devices that can be welded together via a resistance welding process. The one component exhibits at least one circulatory embossing that protrudes beyond its surface toward the connection side and that engages in the complementary recess of the other component. The embossing can be pressed into the recess during the resistance welding process. At least one of the components exhibits on the side spaced from the circulatory embossing additional embossings that limit the impression depth of the circulatory embossing of the one component into the recess of the other component. This is done such that the surfaces facing each other of the two components maintain a fixed distance to one another.

10 Claims, 5 Drawing Sheets

COMPOUNDS FOR POSITIONING DEVICES OF VEHICLE SEATS THAT CAN BE WELDED TOGETHER

TECHNICAL FIELD

The invention relates to components that can be welded together.

BACKGROUND INFORMATION

Components of this type that can be welded together using a capacitor discharge welding process are known in the art. With these known components, during the capacitor discharge welding process, a embossing designated as a facet is pressed into the corresponding recess of the second component to the point that the two facing surfaces are in close contact after welding. To take up the volume displaced during the welding procedure, a catch pouch is provided in the area of the embossing designated as a facet on at least one of the components.

Welding the two components in the known manner is disadvantageous, because the surfaces of the two components intended to be in contact are warped due to tolerances. This is disadvantageous in particular for sensitive positioning devices, such as, for example, tilt adjustment devices for the back rest of vehicle seats that exhibit a meshing tooth system, which requires essentially full parallelism of the swivel axes of the two meshing components.

Furthermore, the applied special resistance welding method, namely the capacitor discharge welding procedure, used for the known components, is comparatively complex.

SUMMARY

Based on this state-of-the-art, it is the objective of the invention to produce components that can be welded together and that enable an exact alignment after the welding process and that can do without the catch pouches for the volume displaced during the welding process.

The present features components for positioning first and second components that can be welded together via a resistance welding process. One component exhibits at least one circulatory embossing that protrudes beyond its surface toward the connection side of the other component, and that engages in the complementary recess of the other component. The embossing can be pressed into the recess during the resistance welding process. At least one of the components exhibits on one of its sides and spaced radially from the circulatory embossings, additional embossings that limit the impression depth of the circulatory embossing of the one component into the recess of the other component. This is done such that the surfaces facing each other of the two components maintain a fixed distance to one another.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
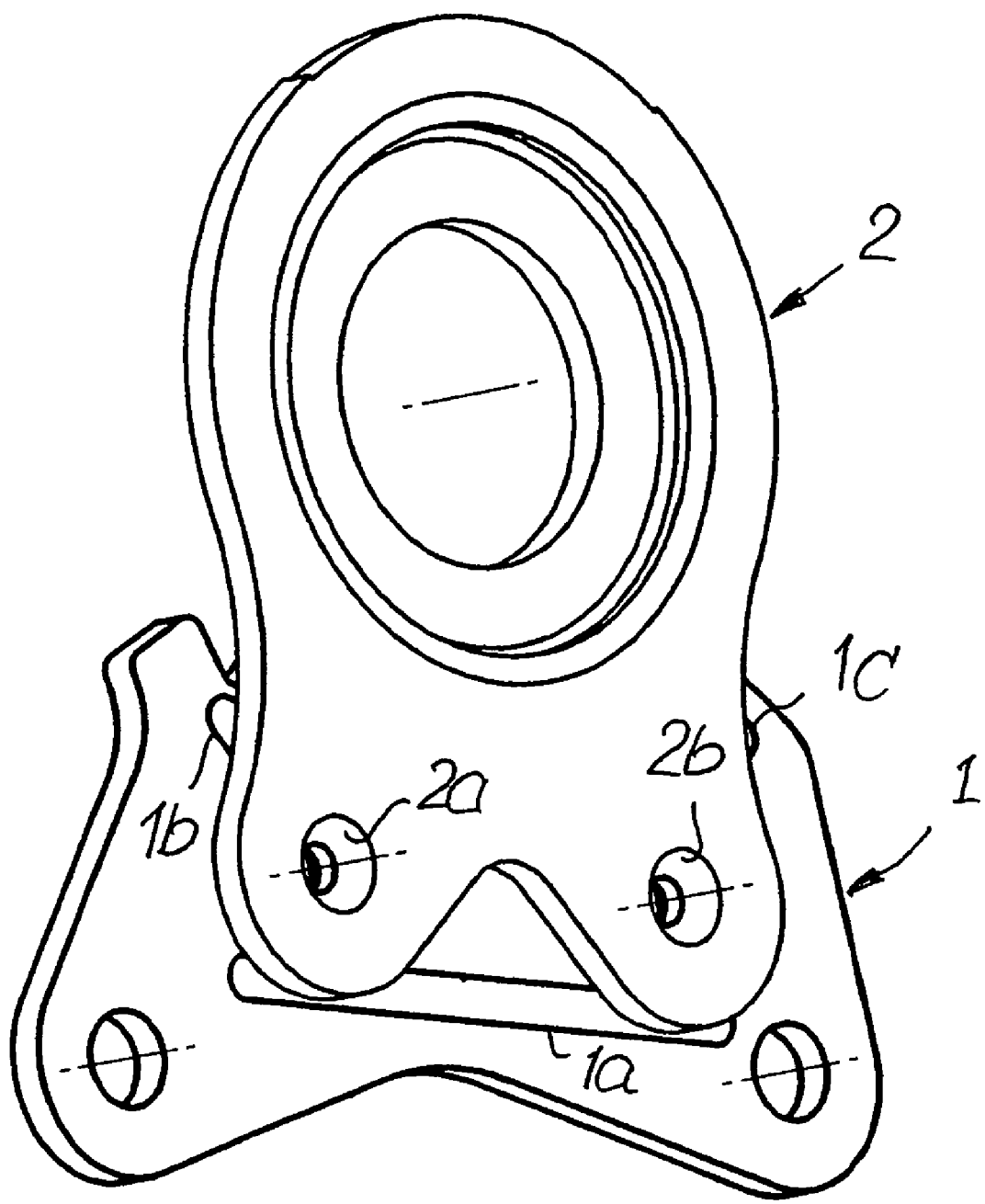
FIG. 1 shows a perspective view of two components welded together.

In the shown exemplary embodiment, a first component 1, FIG. 1, and a second component 2 are welded together. In the shown exemplary embodiment, the first component 1 is an adapter, which is welded to a second component, namely a bottom brace part of a tilt adjustment brace for the backrest of a vehicle seat. Although the present invention will be explained in the context of a vehicle seat mechanism, this is for exemplary purposes only, and not a limitation on the present invention, which can be used in every field on any type of product or process.

Figure 1A:
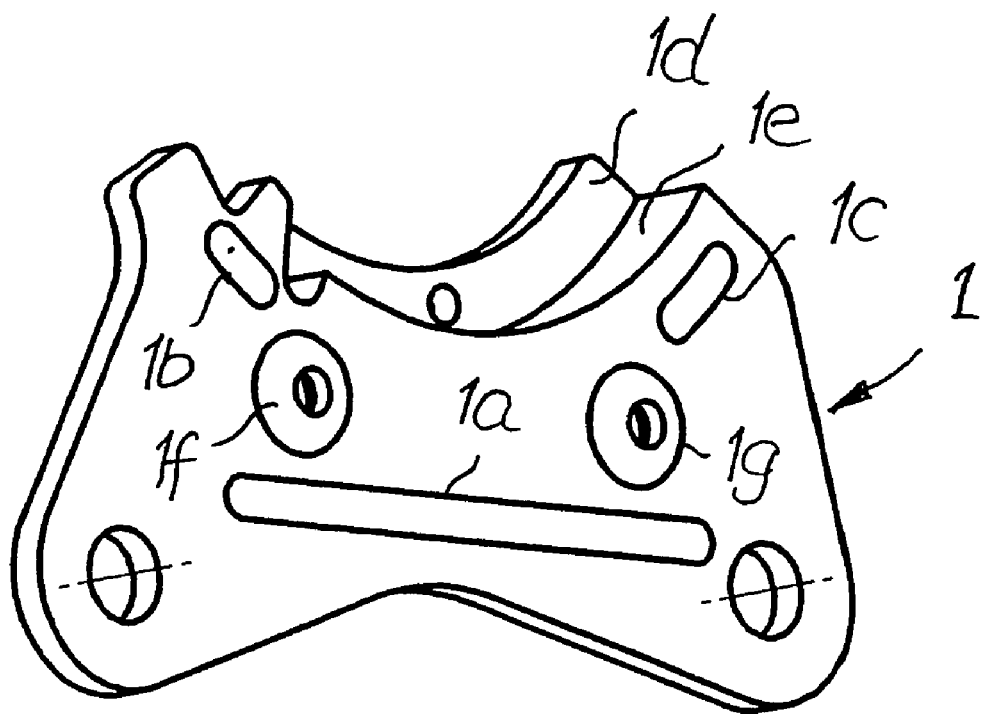
FIG. 1a shows a perspective view of the one component according to the present invention.
Figure 1B:
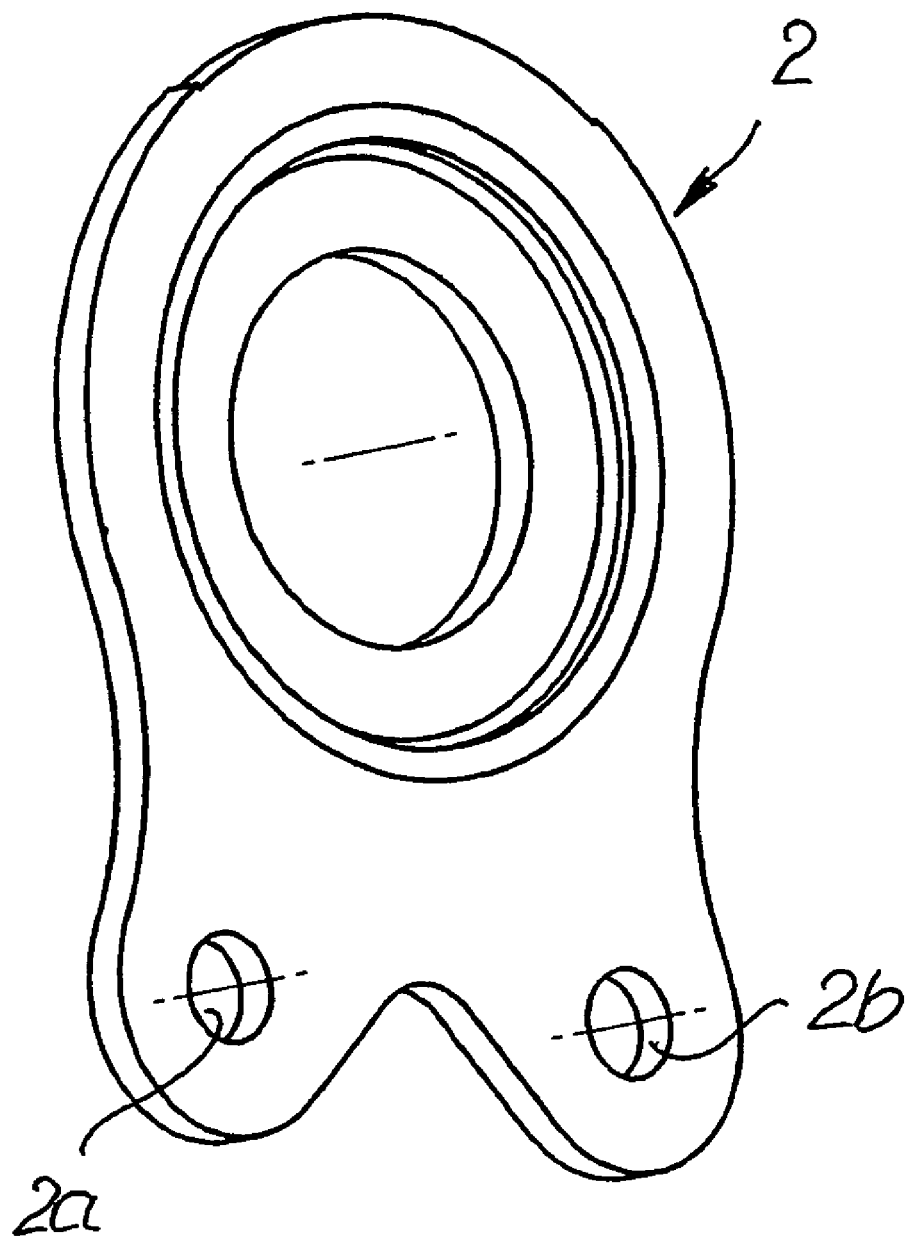
FIG. 1b shows a perspective view of the other component according to the present invention.
Figure 2:
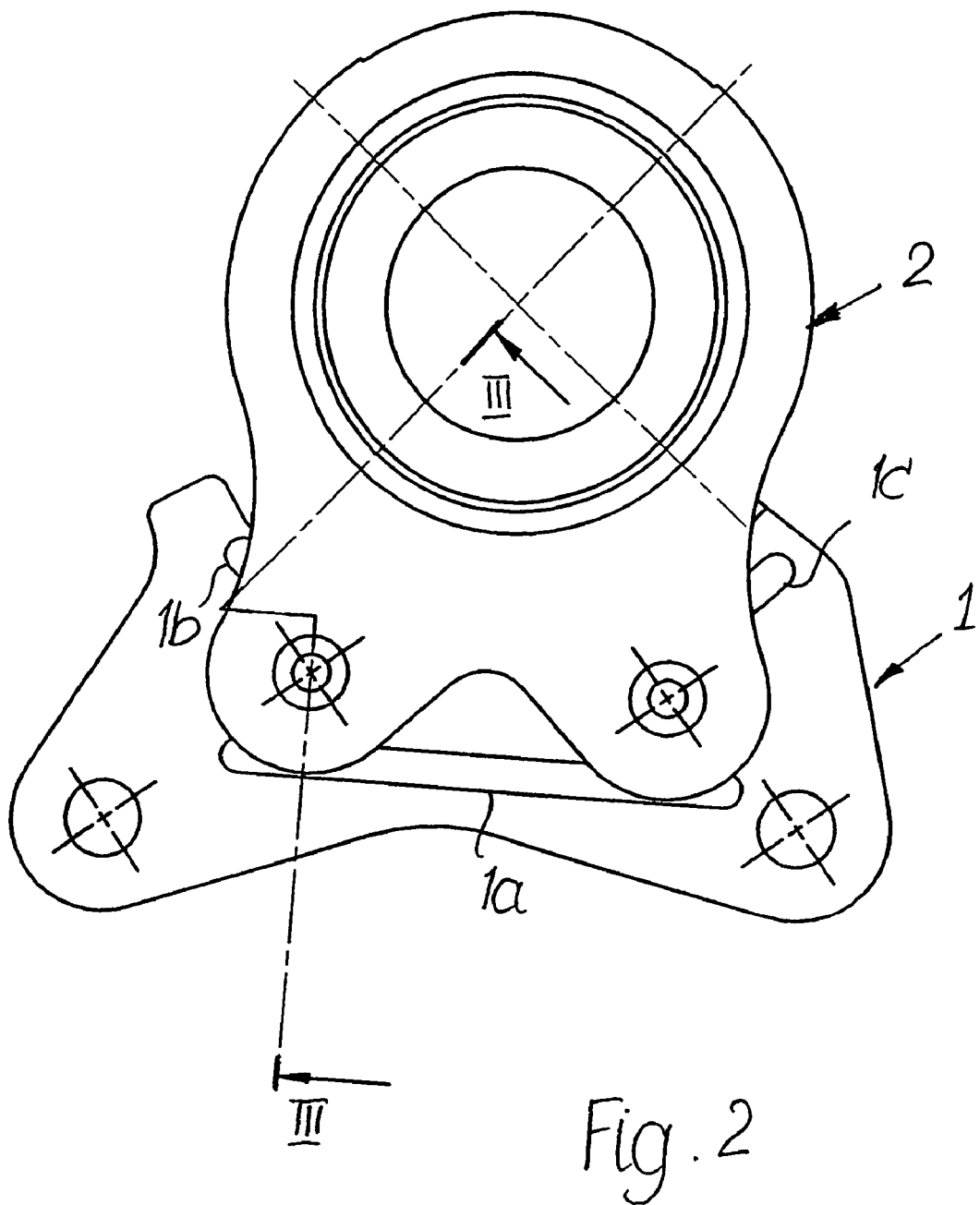
FIG. 2 shows a vertical view of the components shown in FIG. 1 welded together.
Figure 3:
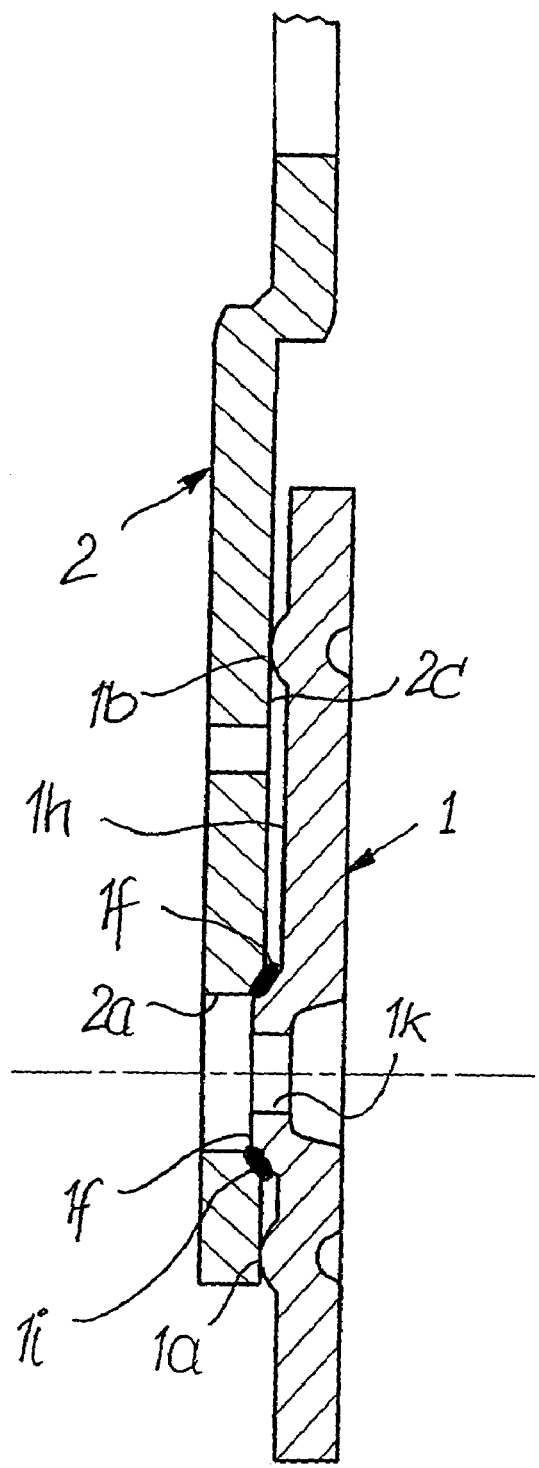
FIG. 3 shows a section along the sectional plane III-III in FIG. 2.

The first component 1 exhibits two circulatory embossings 1f and 1g, FIG. 1a. These circulatory embossings 1f and 1g protrude beyond the surface 1h, FIG. 3, of the first component 1. These circulatory embossings have a central through hole 1k, which can be seen in FIG. 3 for the circulatory embossing 1f.

On the side of the first component 1 and spaced to both the circulatory embossing 1f and the circulatory embossing 1g are provided additional embossings 1a, 1b, and 1c that have the shape of fins that is, they are rectangular or oval in shape. The height of the additional embossings 1a, 1b and 1c toward the common surface 1h is the same. In the welded condition, the additional embossings are resting against the surface 2c of the second component 2. The embossings 1f and 1g engage in complementary recesses 2a and 2b of the second component 2, which are designed with through holes. During resistance welding, material melts in the contact zone between the circulatory embossings 1f and 1g and the associated recesses 2a and 2b. This molten welding material 1i reaches the free space, which is formed as a gap between the surfaces 1h and 2c by the additional embossings 1a, 1b, and 1c.

The first component 1, in the exemplary embodiment, is designed as an adapter and has an arc-shaped recess 1e and an adjacent chamber area 1d. The chamber area 1d overlaps the adjacent area of component 2 as well as an upper brace part that is not shown here.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with the breadth to which they are fairly, legally and equitably entitled.

What is claimed is:

1. Components for positioning first and second components that are to be welded together, whereby one component exhibits at least one circulatory embossing that protrudes beyond its first surface toward the connection surface of another component to which it will be welded, and that engages in a complementary recess in the connection surface of the other component and that is pressed into the complementary recess during a resistance welding process, characterized in that:

at least one of the components includes on one surface, and spaced radially from the circulatory embossings, additional embossings abutting the connection surface, and that by contact limit the impression depth of the circulatory embossing of the one component into the recess of the other component, such that the surfaces facing each other of the two components maintain a spaced distance from one another.

2. The components as set forth in claim 1, wherein the additional embossings each protrude by the same height beyond the surface of the at least one component including said additional embossings.

3. The components as set forth in claim 1, wherein the circulatory embossing exhibits a round circumferential contour and engages in a round recess of the other component.

4. The components as set forth in claim 3, wherein the round circumferential contour corresponds at least approximately to the circumferential contour of a truncated cone.

5. The components as set forth in claim 1, wherein the additional embossings are oblong fins.

6. The components as set forth in claim 1, wherein all embossings are provided on the same surface of the same component.

7. The components as set forth in claim 1, wherein the first and second components are for use in vehicle seats.

8. Components for positioning first and second components of vehicle seats that are to be welded together, whereby the one component exhibits at least one circulatory embossing that protrudes beyond its first surface toward the connection surface of another component to which it will be welded, and that engages in a complementary recess in the connection surface of the other component and that is pressed into the complementary recess during a resistance welding process, characterized in that:

the one component includes on its first surface, and spaced radially from the circulatory embossings, additional embossings that by contact limit the impression depth of the circulatory embossing of the one component into the recess of the other component, such that the surfaces facing each other of the two components maintain a spaced distance from one another.

9. The components as set forth in claim 8, wherein the additional embossings solely, by said contact, limit the impression depth of the circulatory embossing of the one component into the recess of the other component.

10. Components for positioning first and second components that are to be welded together, comprising:

a first component having at least one circulatory embossing that protrudes beyond its first surface toward a connection surface of a second component to which it will be welded, and that engages in a complementary recess in the connection surface of the second component and that is pressed into the complementary recess during a resistance welding process, said first component including on the first surface, and spaced around the circulatory embossings, additional embossings contacting the connection surface of the second component, and that by contact of the additional embossings exclusively limits the impression depth of the circulatory embossing of the one component into the recess of the second component, such that the additional embossings prevent contact and maintain a spaced distance from the at least one circulatory embossing and the complementary recess prior to welding.

* * * * *